(12) United States Patent
Boffi

(10) Patent No.: US 10,903,639 B2
(45) Date of Patent: Jan. 26, 2021

(54) JOINT FOR HIGH VOLTAGE DIRECT CURRENT CABLES

(71) Applicant: PRYSMIAN S.P.A., Milan (IT)

(72) Inventor: Paolo Boffi, Milan (IT)

(73) Assignee: PRYSMIAN S.P.A., Milan (IT)

(*) Notice: Subject to any disclaimer, the term of this patent is extended or adjusted under 35 U.S.C. 154(b) by 167 days.

(21) Appl. No.: 16/334,276

(22) PCT Filed: Sep. 19, 2016

(86) PCT No.: PCT/IB2016/055578
§ 371 (c)(1),
(2) Date: Mar. 18, 2019

(87) PCT Pub. No.: WO2018/051171
PCT Pub. Date: Mar. 22, 2018

(65) Prior Publication Data
US 2019/0237958 A1    Aug. 1, 2019

(51) Int. Cl.
*H02G 15/184*    (2006.01)
(52) U.S. Cl.
CPC ................ *H02G 15/184* (2013.01)
(58) Field of Classification Search
None
See application file for complete search history.

(56) References Cited

U.S. PATENT DOCUMENTS

| 1,563,946 | A | * | 12/1925 | Atkinson | H02G 15/072 174/73.1 |
| 1,585,124 | A | * | 5/1926 | Simons | H02G 15/18 174/21 R |
| 1,589,505 | A | * | 6/1926 | Atkinson | H02G 15/064 174/73.1 |
| 1,628,438 | A | * | 5/1927 | Simons | H02G 15/103 174/73.1 |
| 1,642,515 | A | * | 9/1927 | Simons | H02G 15/10 174/73.1 |

(Continued)

FOREIGN PATENT DOCUMENTS

| DE | 195 32 559 A1 | 3/1997 |
| WO | 00/74191 A1 | 12/2000 |

(Continued)

OTHER PUBLICATIONS

USPTO."371_and_111_a_bypass_part_I_02_2018". (Year: 2018).*

(Continued)

*Primary Examiner* — Jenny L Wagner
*Assistant Examiner* — Muhammed Azam
(74) *Attorney, Agent, or Firm* — Seed IP Law Group LLP

(57) ABSTRACT

A joint for high voltage direct current cables extending along a longitudinal axis between two opposite end portions, the joint including: —a central semiconducting electrode; —two semiconducting deflectors; —a field grading layer longitudinally extending between each one of the deflectors and the central electrode and in electric contact therewith; —a joint insulating layer surrounding the central electrode, the two deflectors and the field grading layer; and —a joint outer semiconductive layer surrounding and in direct contact with the insulating layer.

19 Claims, 6 Drawing Sheets

(56) References Cited

U.S. PATENT DOCUMENTS

| | | | | |
|---|---|---|---|---|
| 1,652,893 A | * | 12/1927 | Eby | H02G 15/24 |
| | | | | 174/22 R |
| 2,222,718 A | * | 11/1940 | Phillips | H02G 15/24 |
| | | | | 174/22 R |
| 2,396,283 A | * | 3/1946 | Papst | H02G 15/04 |
| | | | | 29/828 |
| 2,442,366 A | * | 6/1948 | Leno | H02G 15/10 |
| | | | | 174/73.1 |
| 3,243,756 A | * | 3/1966 | Ruete | H01R 13/53 |
| | | | | 439/89 |
| 3,317,882 A | * | 5/1967 | Schumacher | H01R 13/53 |
| | | | | 439/322 |
| 3,485,935 A | * | 12/1969 | Kreuger | H02G 15/103 |
| | | | | 174/88 R |
| 3,580,986 A | * | 5/1971 | Misare | H02G 15/085 |
| | | | | 174/73.1 |
| 3,692,922 A | * | 9/1972 | Sugimoto | H02G 15/184 |
| | | | | 174/73.1 |
| 3,777,048 A | * | 12/1973 | Traut | H02G 15/184 |
| | | | | 174/73.1 |
| 5,087,492 A | * | 2/1992 | Vallauri | H02G 15/1833 |
| | | | | 174/73.1 |
| 5,492,740 A | * | 2/1996 | Vallauri | B29C 61/065 |
| | | | | 428/34.9 |
| 7,090,796 B2 | * | 8/2006 | Bolcar | H01B 3/28 |
| | | | | 264/135 |
| 8,088,996 B2 | * | 1/2012 | Tornkvist | H01B 17/42 |
| | | | | 174/22 R |
| 10,720,767 B2 | * | 7/2020 | Schubert | H02G 15/064 |
| 2013/0333945 A1 | * | 12/2013 | Portas | H02G 15/064 |
| | | | | 174/84 R |

FOREIGN PATENT DOCUMENTS

| | | |
|---|---|---|
| WO | 2008/076058 A1 | 6/2008 |
| WO | WO2008/076058 * | 6/2008 |
| WO | 2012/083985 A1 | 6/2012 |
| WO | 2012/083986 A1 | 6/2012 |

OTHER PUBLICATIONS

International Search Report and Written Opinion, dated Apr. 12, 2017, for International Application No. PCT/IB2016/055578, 12 pages.

* cited by examiner

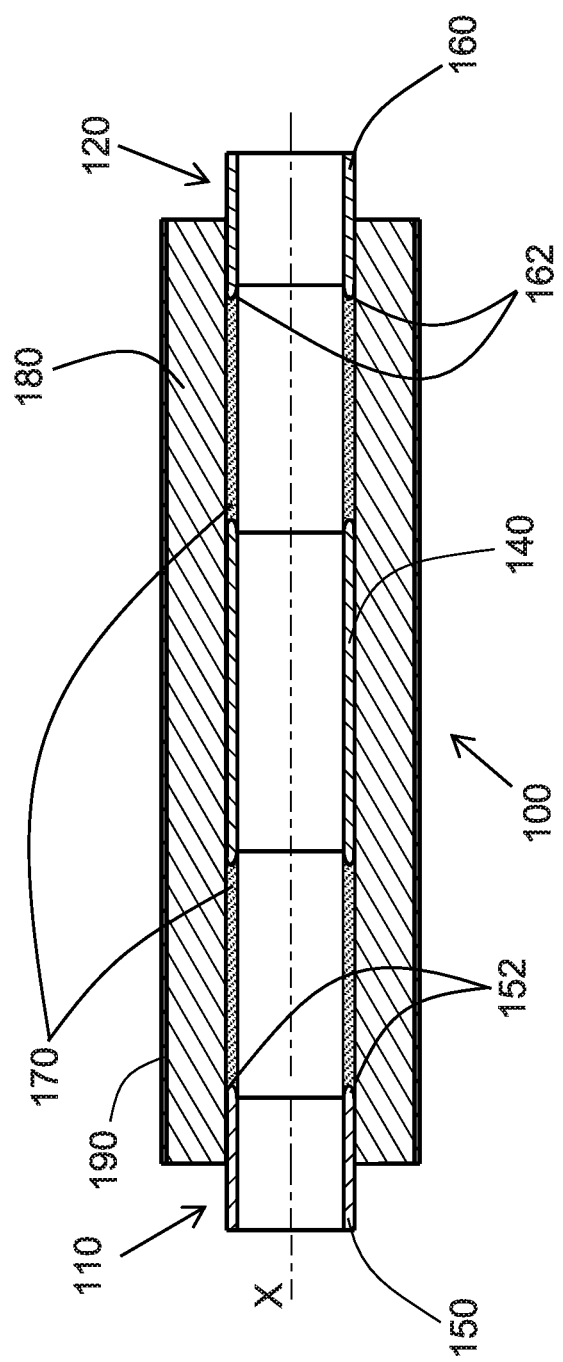

JOINT FOR HIGH VOLTAGE DIRECT CURRENT CABLES

BACKGROUND OF THE INVENTION

The present invention relates to a joint for high voltage direct current (HVDC) cables.

In this specification, the expression "high voltage" (HV) indicates voltages equal or greater than 30 KV. When the voltage is greater than 300 kV, the expression "extra high voltage" (EHV) can be used.

HVDC cables include at least one cable core. The cable core is usually formed by an electrically conductive metal conductor covered by an insulation system. The insulation system is sequentially formed by an inner polymeric layer having semiconductive properties, an intermediate polymeric layer having electrically insulating properties, and an outer polymeric layer having semiconductive properties.

Cable joints are accessories used in an energy network to connect energy cables and to restore the insulation and electric field control over the exposed junction between the conductors of the joined cables.

During assembly operation, the outer semiconductive layer of each cable is first radially then longitudinally cut and removed thus leaving exposed the insulating layer, an end portion of which is, in turn, first radially then longitudinally cut and removed, generally together with the underlaying inner semiconductive layer, thus leaving exposed the conductor. The junction is performed according to known procedures between the two respective exposed conductors, for example by soldering or clamping. The space corresponding to the removed sections of insulating material is generally filled with a metal connector.

A cable joint is generally a sleeve which extends along a longitudinal direction X between two opposite end portion so as to be fit over the conductors connection in an assembled configuration.

The joint usually has a substantially cylindrical central portion, and two substantially conical opposite end portions (stress-relief cones). This sleeve consists of a plurality of radially superimposed tubular layers intended to restore the electrical field control and the mechanical connection between each exposed layer of the joined cables.

The Applicant experienced that, in assembled configuration and under certain operation conditions, for example under unexpected voltage overload conditions, the electric field distribution in the interface region between the cable insulating layers and the joint insulating layer can become not homogeneous. This causes a charge accumulation which can provoke a radial perforation in the cable and/or in the joint insulation layer.

The likelihood of this type of failures increases as the voltage level increases, and it becomes more likely for HV systems at 320 kV or higher.

Therefore, in order to reduce the risk for the above perforation, it is expedient to reduce the concentration of the electric field lines and, accordingly, the electric gradient within the insulating layers as much as possible. To this aim the conventional approach of geometric field control, currently used in AC joints, is not sufficient in DC systems. Therefore, the use of a layer of material having a non-linear conductivity between the cable insulation layer and the joint insulation layer has been proposed.

US 2010/0139974 describes a joint provided with a circumferential joint inner semicon layer connecting the cable inner semicon layers of the two cables, and at least one circumferential and contiguous layer of field grading material connecting the cable outer semicon layer with the joint inner semicon layer and covering the cable insulation layer of the corresponding cable in the region between the cable outer semicon layer and the joint inner semicon layer. A single circumferential and contiguous layer of field grading material can be provided to connect the cable outer semicon layer of the first conductor with the joint inner semicon layer on the one side and connect the cable outer semicond layer of the second conductor with the joint inner semicond layer on the other side so as to completely cover the joint inner semicon layer in the joint region. A field grading material layer is provided so as to connect either directly or indirectly the cable outer semicon layer with the joint inner semicon layer.

US 2014/0116746 relates to an electric field control device, used for high DC voltages, comprising: an inner deflector to be electrically connected to a live high voltage part of the high voltage component; a resistive layer adapted for field controlling purposes electrically connected to a grounded part of the high voltage component; an insulating layer arranged on the resistive layer and having a tapered field control geometry; and a semi-conducting layer arranged on the insulating layer and defining an outer triple point at the intersection of the resistive layer, the insulating layer, and the semi-conducting or conducting layer.

US 2014/0065420 relates to field grading material adapted to control electric fields for high voltage elements having a direct voltage. An element for grading an electric field comprises the field grading material physically in contact with an insulating layer of a power cable. The field grading material separates the insulating layer of a power cable from the semiconductive element(s) or the insulating element(s) of a power cable accessory. A junction connecting two power cables includes an insulation, an outer semi-conducting screen, and a connector to electrically connect the two power cables together. The outer semi-conducting screen surrounds a part of the layers of field grading material.

SUMMARY OF THE INVENTION

The Applicant has faced the problem of providing pre-moulded joints for HVDC cable capable of controlling the electric field and space accumulation charge so as to reduce the risk of cable insulating layer perforation.

The Applicant found out that the above problem can be solved by making a joint provided with a central semiconductive electrode and additional semiconductive electrodes positioned at the joint end portions and with a field grading layer longitudinally extending at least between each of the additional semiconductive electrodes (hereinafter referred to as "deflectors") and the central electrode.

In assembled configuration, the deflectors are positioned so as to bridge the boundaries between the outer semiconductive layer and the insulation layer of each cable.

The combination of deflectors and field grading layer affords the due homogeneity of the electric field between joint and cable, especially between joint and cable insulation even at extreme high voltage, such as voltages of 500-600 KV.

While the field grading layer controls the electric field, the deflectors prevent the increasing of the electric gradient around the cable insulating layer, especially at the boundary with the cable outer semiconductive layer. This prevents undesired charge accumulation in the cable insulating layer as well as high electric field inside the cable insulating layer. The risk of perforation is at least remarkably reduced.

Therefore, according to a first aspect, the present invention relates to a joint for high voltage direct current cables extending along a longitudinal axis between two opposite end portions, the joint comprising:

a central semiconducting electrode;
two semiconducting deflectors;
a field grading layer longitudinally extending between each deflector and the central electrode and in electrical contact therewith;
a joint insulating layer surrounding the central electrode, the two deflectors and the field grading layer; and
a joint outer semiconductive layer surrounding and in direct contact with the insulating layer.

The two deflectors can be positioned and dimensioned so as to longitudinally protrude beyond the joint insulating layer. This configuration of the deflectors eases the handling of the present joint during its installation around the power cables.

The field grading layer according to the invention is in direct contact with both the deflectors and the central electrode.

In an embodiment of the invention, the field grading layer is divided into two portions each in side-by-side relationship with one deflector and the central electrode along the longitudinal axis X. These two portions have substantially the same thickness as the deflectors and the central electrode.

Alternatively, the field grading layer is at least partially superposed over and partially embeds the deflectors, and/or is at least partially superposed over and partially embeds the central electrode.

In a further alternative, the field grading layer is radially interposed between the joint insulating layer and cable insulating layers, the deflectors and/or central electrode.

Preferably the joint insulating layer or the joint outer semiconductive layer or both have a substantially rectangular cross section in longitudinal direction.

Preferably, the rectangular cross sections of the joint insulating layer and of the joint outer semiconductive layer have substantially the same length. This makes the joint of the invention easy and simple to be manufactured being substantially free from complex geometries that inevitably cause difficulties in the production of the joint and increase its cost.

In the above embodiment of the invention an electrical connection among the joint outer semiconductive layer, the deflectors and the cable outer semiconductive layer down to the cable screens is provided when the joint is assembled on connected cables, for example by a mash of an electrically conductive material, such as copper.

Alternatively, the joint outer semiconductive layer envelopes the joint insulating layer, the field grading layer, and directly contacts each of the deflectors. In this case, when the joint is assembled over the connected power cables, the joint outer semiconducting layer has length such as to extend over the exposed length of the outer semiconducting layers of the cables and to contact the cable screens.

In this configuration, preferably, the joint outer semiconductive layer has a substantially conical shape at its longitudinal ends.

For the purpose of the present description and of the claims that follow, except where otherwise indicated, all numbers expressing amounts, quantities, percentages, and so forth, are to be understood as being modified in all instances by the term "about". Also, all ranges include any combination of the maximum and minimum points disclosed and include any intermediate ranges therein, which may or may not be specifically enumerated herein.

Also, the terms "a" and "an" are employed to describe elements and components of the invention. This is done merely for convenience and to give a general sense of the invention. This description should be read to include one or at least one, and the singular also includes the plural unless it is obvious that it is meant otherwise.

As "insulating layer" it is meant a layer made of a material having a conductivity comprised between $10^{-16}$ and $10^{-14}$ S/m.

As "semiconductive layer" it is meant a layer made of a material having a conductivity comprised between $10^{-1}$ and 10 S/m.

As "field grading layer" it is meant a layer made of a material having a conductivity depending on the electrical gradient applied thereto. At low electrical gradient a field grading material behaves as an insulating material, while its conductivity increases with an increase of the electrical gradient. Advantageously, a field grading material has a conductivity substantially equal to that of an insulating layer, for example comprised between $10^{-16}$ and $10^{-14}$ S/m, at low electrical gradient, for example up to 4-5 kV/mm, and increases, linearly or stepwise, for example to $10^{-11}$-$10^{-8}$ S/m at an electrical gradient higher than 8-10 kV/mm.

Materials having field grading properties as defined above are well known in the art, and are usually made from a polymeric material including a filler that is able to impart the desired field grading properties, such as $Al_2O_3$, $TiO_2$, $BaTiO_3$, ZnO, SiC, optionally admixed with carbon black. Suitable field grading materials are disclosed, for example, in WO 2008/054308, WO 2008/07605, US 2006/0145119 and US 2014/0065420.

The polymeric material may be selected from those commonly used in the art, such as elastomeric polyolefin, e.g. ethylene-propylene copolymers (EPR) or ethylene-propylene-diene terpolymers (EPDM), thermoplastic polyolefins, e.g. polyethylene or ethylene copolymers, silicone rubbers.

Depending on the specific filler, the electrical resistivity of the material may vary linearly with the electric gradient, or, preferably, it may have a non-linear dependency from the electrical gradient.

BRIEF DESCRIPTION OF THE DRAWINGS

Further characteristics will be apparent from the detailed description given hereinafter with reference to the accompanying drawings, in which:

FIG. 6 is a schematic cross-sectional side view of a further joint according to the present invention.

DETAILED DESCRIPTION OF THE PREFERRED EMBODIMENTS

A joint 100 for the connection of two HVDC cables 200, 300 according to the present invention is shown in FIGS. 1 to 6.

Figure 1:
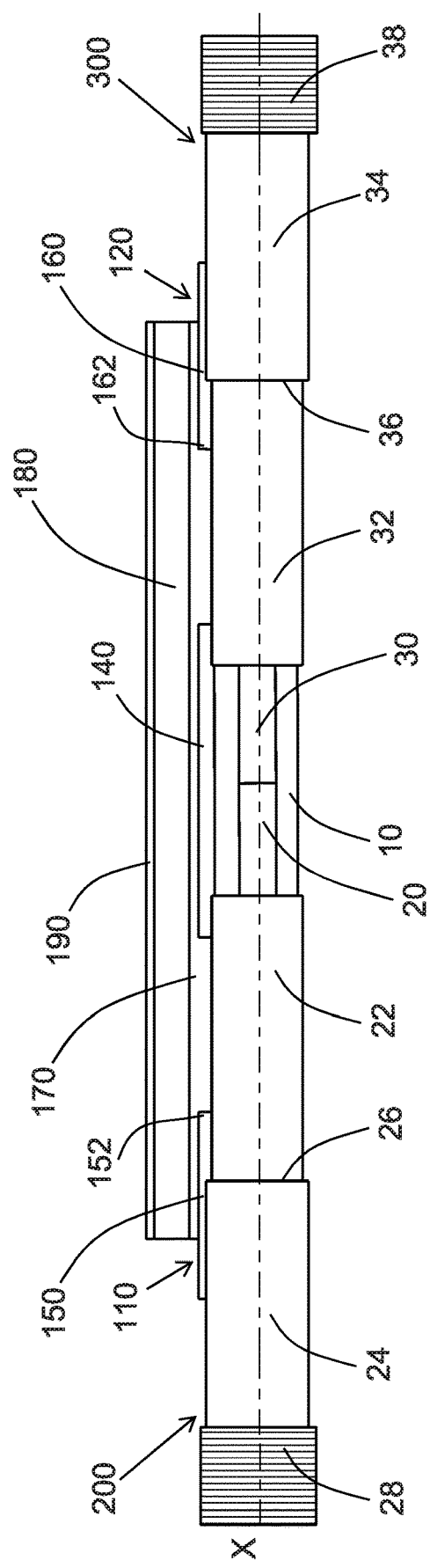
FIG. 1 is a schematic cross-sectional side view of the joint according to the present invention in an assembled configuration with two connected cables.
Figure 5:
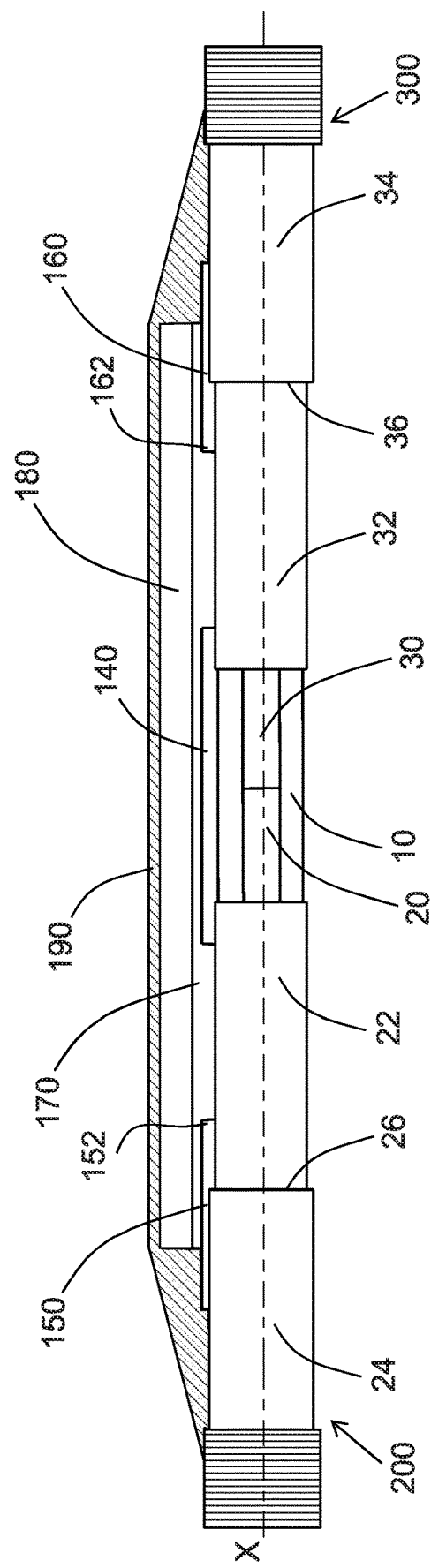
FIG. 5 is a schematic cross-sectional side view of another embodiment of the joint of the invention in assembled configuration with two connected cables.

In particular, FIGS. 1 and 5 show a joint 100 according to the invention assembled on two joined HVDC cables 200, 300 each comprising respective conducting core 20, 30 and a cable insulation system surrounding the respective conducting core 20, 30. Each cable insulation system comprises a cable inner semiconductive layer (not illustrated) surrounding and in contact with the respective conducting core 20, 30, a cable insulating layer 22, 32, surrounding and in contact with the respective inner semiconductive layer, and a cable outer semiconductive layer 24, 34, surrounding and in contact with the respective insulating layer 22, 32. Around to the outer semiconductive layer 24, 34 a metal screen 28, 38 is provided.

During junction operation, the end portion of each HVDC cable 200, 300 to be connected is peeled so as to expose a tract of conducting core 20, 30 and a tract of cable insulating layer 22, 32. In particular, each metal screen 28, 38 and each cable outer semiconductive layer 24, 34 is cut and removed leaving exposed a tract of the respective cable insulating layer 22, 32. A boundary 26, 36 is formed between each cable outer semiconductive layer 24, 34 and the respective insulating layer 22, 32.

As shown in FIGS. 1 and 5, the junction between two HVDC cables 200, 300 is performed by connecting the respective conducting cores 20, 30, e.g. by soldering or clamping. Once the electrical connection between the abovementioned conductors has been performed, the space corresponding to the removed sections of insulating material is filled with a metal connector 10.

In an assembled configuration, the joint 100 is fitted on the connected HVDC cables 200, 300.

As from FIGS. 1-6, the joint 100 extends along a longitudinal direction X between two opposite end portions 110, 120 and that is suitable to be fit over the conducting core connection in the assembled configuration.

The joint 100 comprises a central electrode 140, made of semiconductive material and two deflectors 150, 160, made of semiconductive material.

The central electrode 140 is positioned in an intermediate position with respect to the end portion 110, 120 of the joint 100 and, as shown in FIGS. 1 and 5, is arranged to surround the metal connector 10 around the connected conducting cores 20, 30.

The two deflectors 150, 160 are positioned at the end portions 110, 120 of the joint 100 and, in the assembled configuration, are arranged to surround the boundaries 26, 36 and neighbouring portions of the respective cable outer semiconductive layer 24, 34 and insulating layer 22, 32.

The joint 100 also comprises a field grading layer 170 which, in the embodiment of FIGS. 1-3 and 5, longitudinally extends to partially cover and partially embed the two deflectors 150, 160 and to totally cover and partially embed the central electrode 140.

In particular, the field grading layer 170 overlaps the radially external surface and the longitudinal ends of the central electrode 140, and partially overlaps the radially external surface of the two deflectors 150, 160 and embeds their longitudinal end facing the central electrode 140. The field grading layer 170, transversally extends so as to be interposed between each one of the deflectors 150, 160 and the central electrode 140.

The joint 100 further comprises a joint insulating layer 180 that overlaps the field grading layer 170 so as to be positioned radially external thereto, and a joint outer semiconductive layer 190 overlapping the insulating layer 180 so as to be positioned radially external to such an insulating layer 180. In the embodiment of the FIGS. 1-5, the field grading layer 170 longitudinally extends so as to be interposed between the insulating layer 180 and the electrodes 140, 150, 160.

Alternatively, as shown in FIG. 6, the field grading layer 170 is divided into two portions each in side-by-side relationship with one deflector 150, 160 and the central electrode 140 along the longitudinal axis X. In this case, the material of the field grading layer 170 is not superposed to deflector 150, 160 and central electrode 140. The field grading layer 170 longitudinally extends just between each one of the deflectors 150, 160 and the central electrode 140. In this alternative embodiment, the insulating layer 180 overlaps the field grading layer 170 and the electrodes 140, 150, 160.

In the embodiments of FIGS. 1-4 and 6, the field grading layer 170, the joint insulating layer 180 and the joint outer semiconductive layer 190 have substantially the same longitudinal dimension.

Figure 2:
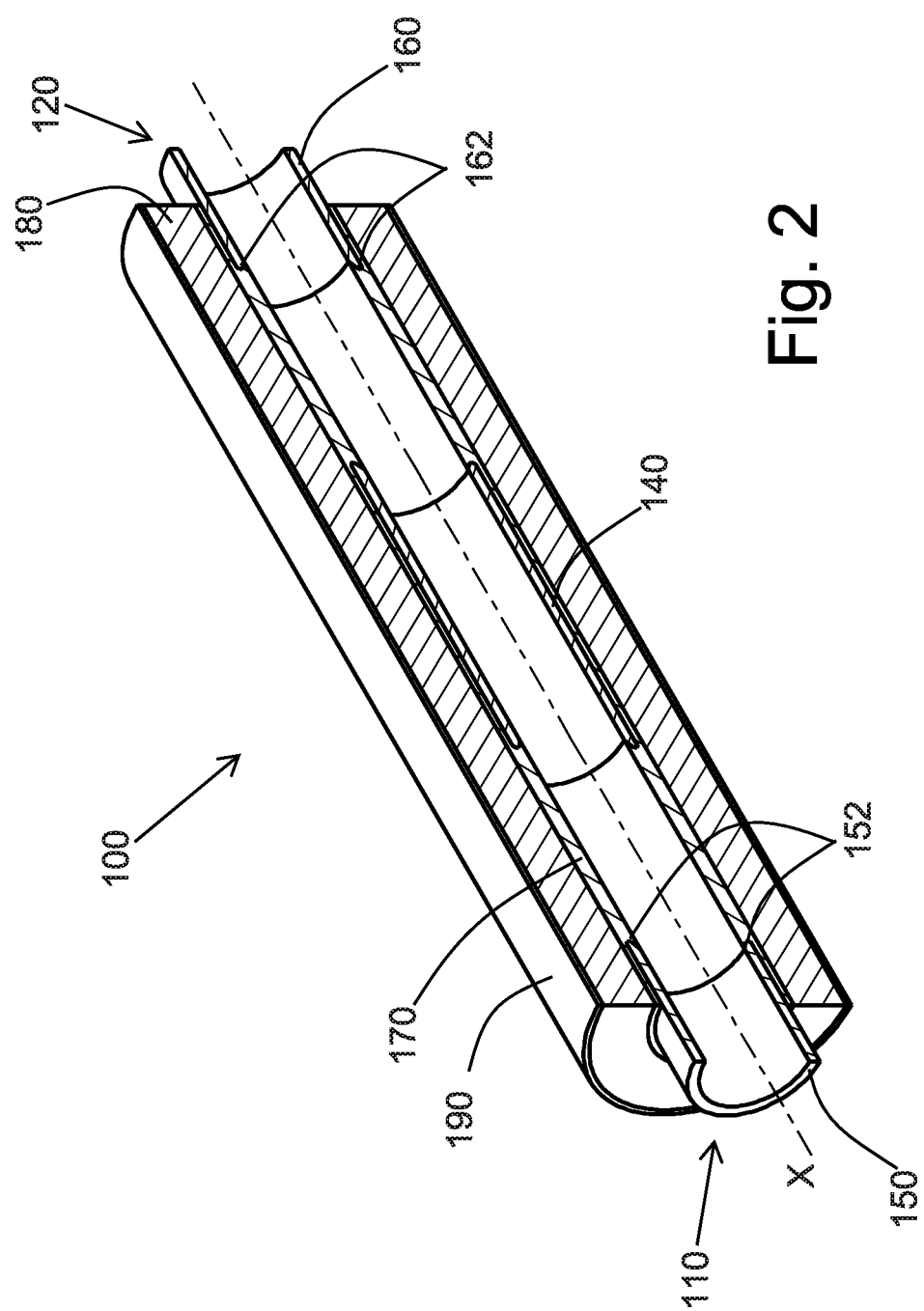
FIG. 2 is a schematic cross-sectional perspective view of a joint for HVDC cables according to the present invention.
Figure 3:
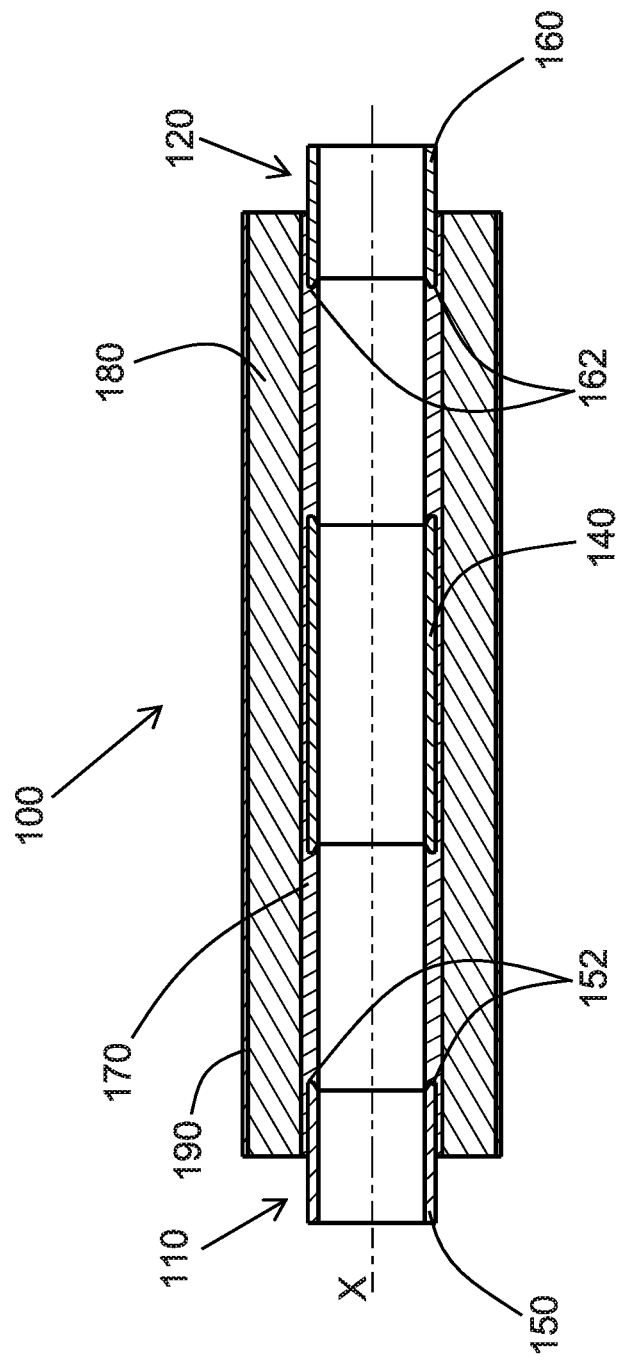
FIG. 3 is a schematic cross-sectional side view of the joint of FIG. 2.

In the embodiment of FIGS. 2 and 3, the two deflectors 150, 160 are positioned and dimensioned so as to protrude beyond the end portions of the field grading layer 170 of the joint insulating layer 180 and of the joint outer semiconductive layer 190.

Figure 4:
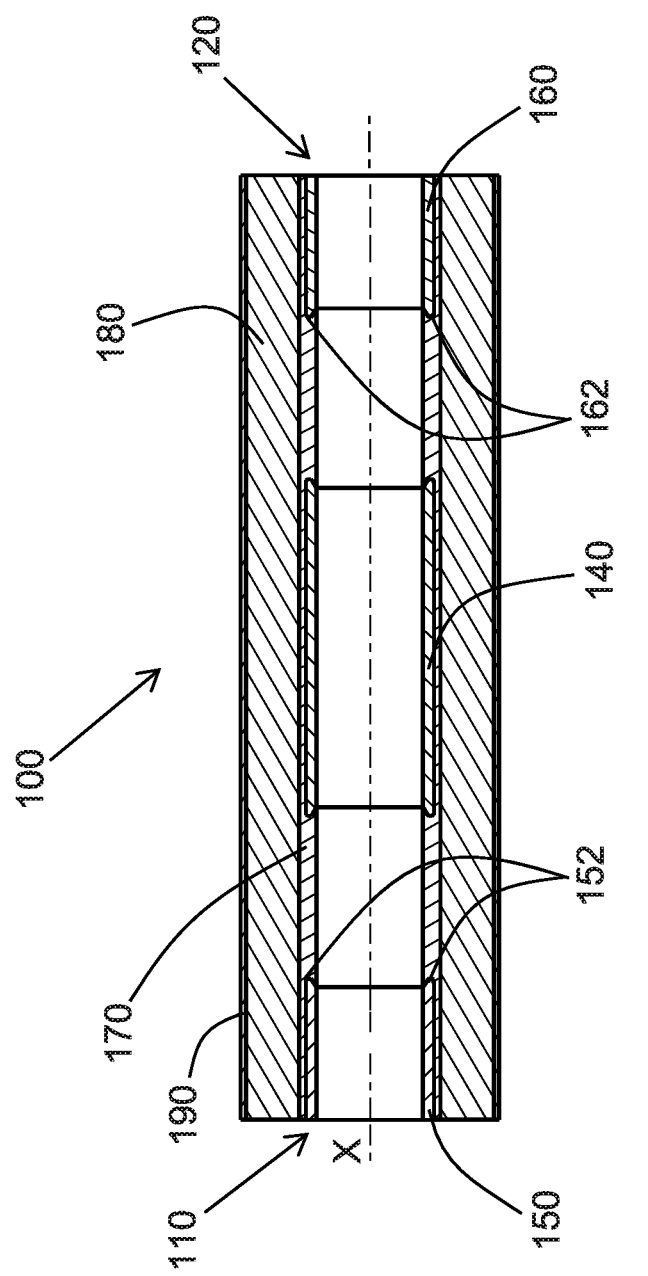
FIG. 4 is a schematic cross-sectional side view of another joint according to the present invention.

In the embodiment of FIG. 4, the two deflectors 150, 160 are positioned and dimensioned so to end at the end portions 110, 120 of the joint 100.

As it can be observed in FIGS. 3 and 4, the extremities 152, 162 of the two deflectors 150, 160 facing towards the central electrode 140 are chamfered without tips in order to reduce the risk of charge accumulation. Also, both the ends of the central electrode 140 are chamfered without tips in order to reduce the risk of charge accumulation. In the embodiment where the field grading layer 170 partially embeds the two deflectors 150, 160 and the central electrode 140, as shown in FIGS. 1-5, the material of the field grading layer 170 intrudes around their chamfered ends In the embodiments of FIGS. 1-4 and 6, the joint insulating layer 180 and the joint outer semiconductive layer 190 have a substantially rectangular longitudinal cross-section. In this case, which is preferred according to the invention, the joint outer semiconductive layer 190 is electrically connected to the deflectors 150, 160, the cable outer semiconductive layer 24, 34 and the cable screens 28-38, for example by a copper mesh.

In the embodiment of FIG. 5, the joint outer semiconductive layer 190 has ends extending over the ends of the joint insulating layer 180 and of the field grading layer 170 so as to reach two deflectors 150, 160 and, in the assembled configuration, the cable outer semiconductive layers 24, 34 and the cables screens 28, 38. In this case, no further electrical connection is needed to join the joint outer semiconductive layer 190, the deflectors 150,160, the cable outer semiconductive layers 24, 34 and the cable screens 28, 38.

The thickness of the layers of the joint of the present invention can be selected in view of the voltage of the cables to be connected and of the specific materials used for the joint itself, according to the skilled person experience. For example, the joint for cables designed to transport 500 kV can have deflectors from 6 to 12 mm thick, field grading layer from 9 to 16 mm thick and a joint insulating layer from 30 to 60 mm thick.

The invention claimed is:

1. A joint for connecting high voltage direct current cables along a longitudinal axis, the joint comprising:
   a central semiconducting electrode;
   two semiconducting deflectors;

a field grading layer longitudinally extending between each one of the semiconducting deflectors and the central electrode and in electric contact therewith;

a joint insulating layer surrounding the central semiconducting electrode, the two semiconducting deflectors and the field grading layer; and a joint outer semiconductive layer surrounding and in direct contact with the joint insulating layer;

wherein the field grading layer and the joint insulating layer have a same longitudinal dimension, an end portion of the field grading layer being substantially plumb with a respective end portion of the joint insulating layer.

2. The joint according to claim 1 wherein the two semiconducting deflectors are positioned and dimensioned so as to each longitudinally protrudes beyond respective end portions of the joint insulating layer.

3. The joint according to claim 1 wherein the two semiconducting deflectors are positioned and dimensioned so to each longitudinally ends at respective end portions of the joint.

4. The joint according to claim 1 wherein the field grading layer is at least partially superposed over and partially embeds the semiconducting deflectors, and is at least partially superposed over and partially embeds the central semiconducting electrode.

5. The joint according to claim 1 wherein the joint insulating layer and the joint outer semiconductive layer have rectangular cross sections in a longitudinal direction and have substantially a same length.

6. The joint according to claim 1 wherein the joint outer semiconductive layer has a substantially conical shape at its longitudinal ends and envelopes the joint insulating layer, the field grading layer and each of the semiconducting deflectors.

7. A cable assembly, comprising:
a first cable having a first cable end, the first cable end including a first conducting core, a first insulating layer and a first semiconductive outer layer, the first conducting core being exposed from the first insulating layer, and the first insulating layer being exposed from the first semiconductive outer layer;

a second cable having a second cable end substantially aligned with the first cable end in a first direction, the second cable end including a second conducting core, a second insulating layer and a second semiconductive outer layer, the second conducting core being exposed from the second insulating layer, and the second insulating layer being exposed from the second semiconductive outer layer;

a metal connector positioned radially adjacent to both the first conducting core and the second conducting core and between the first insulating layer and the second insulating layer in the first direction; and a joint having a central semiconducting electrode, a first semiconducting deflector and a second semiconducting deflector, the first semiconducting deflector being separated from the second semiconducting deflector by the central semiconducting electrode in the first direction, the central semiconducting electrode being positioned radially adjacent to the metal connector, the first semiconducting deflector being positioned so as to radially bridge a boundary between the first semiconductive outer layer and the first insulating layer, and the second semiconducting deflector being positioned so as to radially bridge a boundary between the second semiconductive outer layer and the second insulating layer;

wherein the joint further includes a field grading layer that is positioned between the central semiconducting electrode and each of the first semiconducting deflector and the second semiconducting deflector in the first direction, the field grading layer not overlapping each of the central semiconducting electrode, the first semiconducting deflector and the second semiconducting deflector in a second direction orthogonal to the first direction.

8. The cable assembly of claim 7, wherein the joint further includes a joint insulating layer, the joint insulating layer being separated from the first insulating layer by the first semiconducting deflector and being separated from the second insulating layer by the second semiconducting deflector.

9. The cable assembly of claim 8, wherein the joint insulating layer overlaps one or more of the first semiconductive outer layer or the second semiconductive outer layer in a second direction that is orthogonal to the first direction.

10. The cable assembly of claim 8, wherein one or more of the first semiconducting deflector or the second semiconducting deflector extends beyond the joint insulting layer.

11. The cable assembly of claim 7, wherein the joint further includes a joint semiconductive outer layer surrounding the joint insulating layer.

12. The cable assembly of claim 11, wherein the joint semiconductive outer layer covers one or more of the first semiconducting deflector or the second semiconducting deflector from the first direction.

13. The cable assembly of claim 11, wherein the joint semiconductive outer layer directly overlaps an exposed portion of one or more of the first semiconductive outer layer of the first cable end or the second semiconductive outer layer of the second cable end in a second direction that is orthogonal to the first direction.

14. A joint for connecting high voltage direct current cables along a longitudinal axis, the joint comprising:
a central semiconducting electrode;
two semiconducting deflectors;
a field grading layer longitudinally extending between each one of the semiconducting deflectors and the central semiconducting electrode and in electric contact therewith;
a joint insulating layer surrounding the central semiconducting electrode, the two semiconducting deflectors and the field grading layer; and
a joint outer semiconductive layer surrounding and in direct contact with the insulating layer;
wherein the field grading layer is positioned between the central semiconducting electrode and each of the first semiconducting deflector and the second semiconducting deflector along the longitudinal axis, the field grading layer not overlapping each of the central semiconducting electrode, the first semiconducting deflector and the second semiconducting deflector.

15. The joint according to claim 14 wherein the two semiconducting deflectors are positioned and dimensioned so as to each longitudinally protrude beyond respective end portions of the joint insulating layer.

16. The joint according to claim 14 wherein the two semiconducting deflectors are positioned and dimensioned so to each longitudinally end at respective end portions of the joint.

17. The joint according to claim 14 wherein the joint insulating layer and the joint outer semiconductive layer have rectangular cross sections in a longitudinal direction and have substantially a same length.

18. The joint according to claim 14 wherein the joint outer semiconductive layer has a substantially conical shape at its longitudinal ends and envelopes the joint insulating layer, the field grading layer and each of the semiconducting deflectors.

19. A cable assembly, comprising:
a first cable having a first cable end, the first cable end including a first conducting core, a first insulating layer and a first semiconductive outer layer, the first conducting core being exposed from the first insulating layer, and the first insulating layer being exposed from the first semiconductive outer layer;
a second cable having a second cable end substantially aligned with the first cable end in a first direction, the second cable end including a second conducting core, a second insulating layer and a second semiconductive outer layer, the second conducting core being exposed from the second insulating layer, and the second insulating layer being exposed from the second semiconductive outer layer;
a metal connector positioned radially adjacent to both the first conducting core and the second conducting core and between the first insulating layer and the second insulating layer in the first direction; and
a joint having a central semiconducting electrode, a first semiconducting deflector and a second semiconducting deflector, the first semiconducting deflector being separated from the second semiconducting deflector by the central semiconducting electrode in the first direction, the central semiconducting electrode being positioned radially adjacent to the metal connector, the first semiconducting deflector being positioned so as to radially bridge a boundary between the first semiconductive outer layer and the first insulating layer, and the second semiconducting deflector being positioned so as to radially bridge a boundary between the second semiconductive outer layer and the second insulating layer;
wherein the field grading layer and the joint insulating layer have a same longitudinal dimension, an end portion of the field grading layer being substantially plumb with a respective end portion of the joint insulating layer.

* * * * *